6461X
D. Anthony.
Horse Shoe Machine.
Patented Apl. 8. 1831.
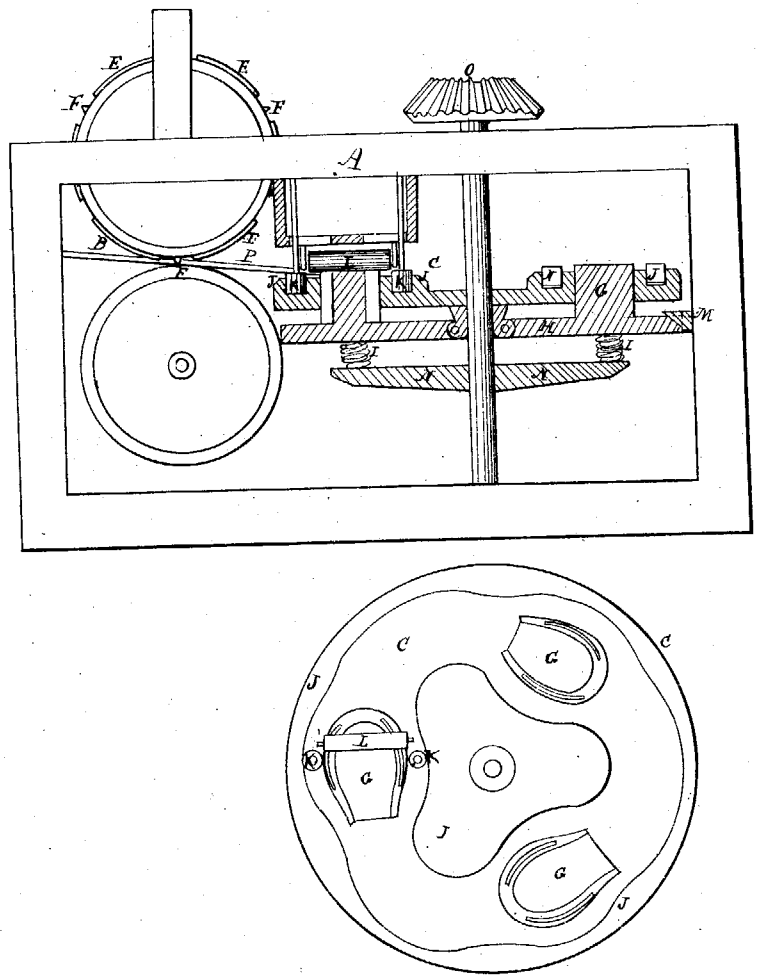
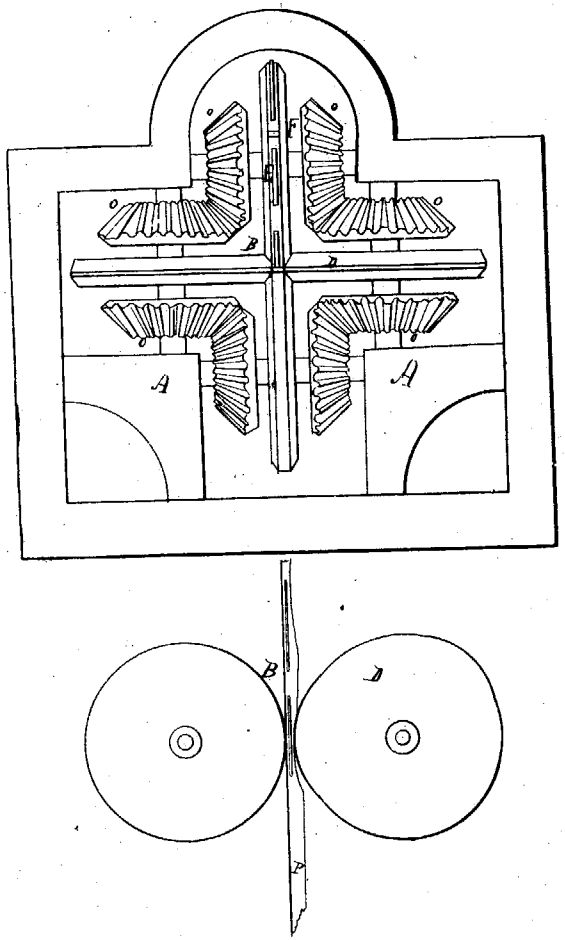

968 6461X April 8, 1831 249

David Anthony Junr Adams, Massachusetts.
Letters Patent.
Dated April 8th 1831.

The Schedule referred to in these Letters Patent and making part of the same containing a description in the words of the said David Anthony Junior himself of his improvement being a machine for making horse shoes.

---

Be it known that I, David Anthony Jr. of the Town of Adams in the County of Berkshire and State of Massachusetts, have made a new and useful improvement, being a machine for making Horse Shoes, which is described as follows.

This machine consists of three principal parts: 1. The Frame. 2. The Wheels to shape and countersink the iron for the shoes. 3. The horizontal wheel, rollers, cams, &c. to form the shoes.

Its operation is somewhat similar to the common Rolling mill for rolling iron.

1. The Frame. This is of iron about three feet long, three feet wide, and two feet six inches high.

2. The wheels to shape and countersink the iron for the shoes. Within the above mentioned frame, and near one end of it, are placed four iron wheels about fourteen inches in diameter, and two inches in thickness, two of which run horizontally and two vertically, with their peripheries so far apart as to leave a space equal to the size of the piece of iron intended for the shoe. Each wheel has an axle whose gudgeons run in brass boxes in the frame; and the edges of each wheel are bevelled. One of the horizontal wheels has its circumference divided into three equal parts and each part shaped in the form of a segment of a larger circle than the wheel, in order to give a proper taper to the piece of iron for the shoe. The upper vertical wheel has six grooves at equal distances apart on its circumference; into each of which grooves is let a piece of steel or cast iron projecting about an eighth of an inch; the piece of steel or cast iron, forms the countersink on the under side of the shoe for the heads of the nails. There are also on the circumference of this wheel, three chisels placed at equal distances apart to cut the bar of iron into proper lengths for the shoes as it advances between the wheels, or the chisels may be placed at unequal distances apart for different sized shoes. The wheels are geared together and made to revolve equally, by mitre cog wheels or bevel gearing on their axles working into each other

[illegible]

3. The horizontal wheel, Rollers, Cams, &c. to form the shoe.
This wheel is of iron twenty eight inches in diameter, one inch in thickness, turning hori-
zontally on an axle whose gudgeons turn in brass boxes, in the upper and lower cross
pieces of the frame; its periphery revolves near where the four wheels above described
come together, and where the iron, when prepared for shaping into shoes, leaves them.
The rim of this wheel has three spaces left in it at equal distances apart; each space
being sufficiently large to admit the pattern hereafter to be described to rise and fall
when necessary. From the axle or shaft of this wheel projects about an inch a small
piece of iron to which is attached by a joint or hinge a lever; on the end of which lever
is secured the pattern around which is formed the shoe: the lever with the pattern is
held up to its place by a spring resting on an arm projecting from the axle or shaft
below the lever. On the upper surface of the rim of the wheel are cams to guide the rollers
hereafter to be described. To the upper part of the frame are attached two iron rollers, which
with the aid of the pattern and cams form the shoe. The rollers turn horizontally and
are allowed to move laterally in a mortise in the frame sufficiently large to receive
them. Another roller is placed across the rim of the wheel, between, or just behind the
rollers last mentioned and serves to keep the piece of iron in its place while bending.
To the frame, a few inches beyond the rollers, is attached a cam, which as the wheel re-
volves, comes in contact with the end of the lever, presses it down with the pattern,
and leaves the shoe discharged, and the pattern ready to receive another. There are
two other levers and patterns besides the one just described, and similar to it attached
to the above mentioned axle. This horizontal wheel is geared to the four wheels first
described by mitre cog wheels or bevil gearing, and is turned at the same time and
by the same power that turns them.

For a further illustration of this machine reference must be had to the an-
nexed drawings of the same forming part of this specification.

Operation. The machine being put in motion by water or steam power, and
the bar of iron heated to a red heat, the end of the bar is passed into the space for-
med by the peripheries of the four wheels coming nearly together and [illegible], coun-
tersunk, and cut into proper lengths for the shoes by the revolution of the wheels;
each piece cut after this operation, and as it leaves the four wheels is received by the
horizontal wheel between the rollers and pattern, bent round the latter by the revolution

6461X of the wheel and thus formed into a shoe. It is then discharged by the stationary cam pressing down the lever and pattern. At each revolution of the wheel three shoes are formed, but a greater number may be made by increasing the size of the wheel.

What I claim as my invention, and which I wish to secure by Letters Patent is the machine for making horse shoes as above described.

In testimony that the above is a true description of my invention I have hereunto signed my name before two witnesses and made affirmation to the same at the City of Washington this 25th day of March 1831.

Witnesses
William P. Elliott
Thomas H. DeWitt

David Anthony Jr.

(1032 wds)

1032-1033